Figure 1:
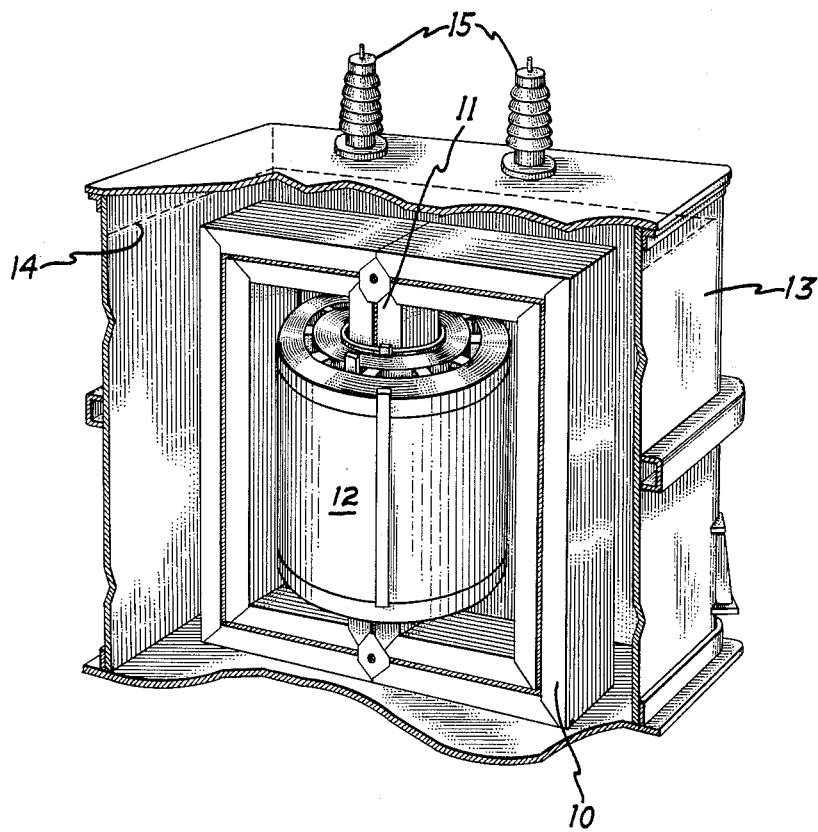

April 25, 1961   L. RABINS   2,981,910
COIL FOR ELECTRICAL INDUCTION APPARATUS
Filed Oct. 29, 1958   2 Sheets-Sheet 1

Inventor,
Leonard Rabins,
by Gilbert P. Tarlton
His Attorney.

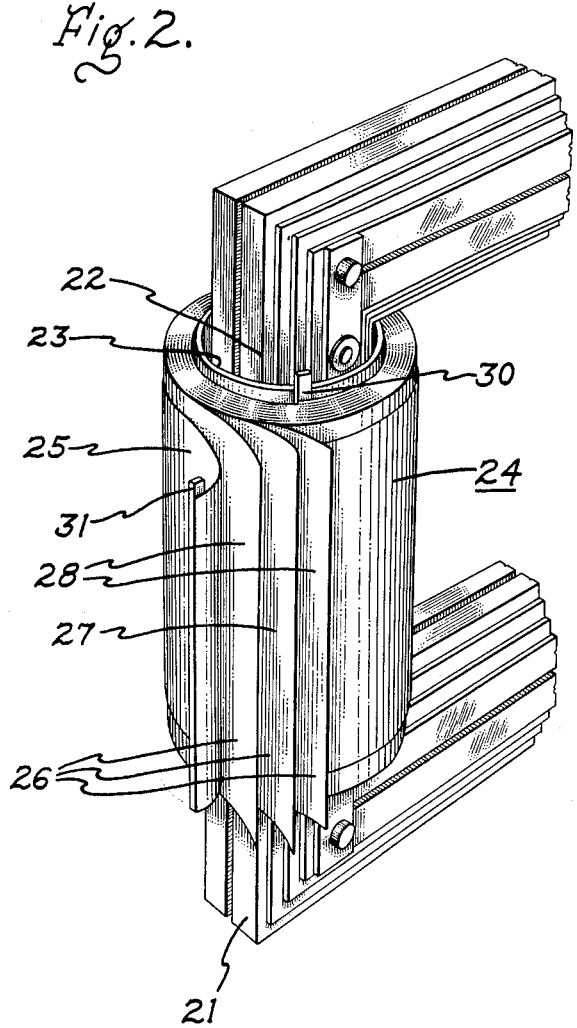

United States Patent Office 2,981,910
Patented Apr. 25, 1961

2,981,910

COIL FOR ELECTRICAL INDUCTION APPARATUS

Leonard Rabins, Pittsfield, Mass., assignor to General Electric Company, a corporation of New York Filed Oct. 29, 1958, Ser. No. 770,342

9 Claims. (Cl. 336—58)

This invention relates to stationary electrical induction apparatus, and more in particular to an improved winding of the foil wound type especially adapted for use in transformers of the type employed in systems for the generation and distribution of electrical power.

Transformers of the type employed in electrical power systems generally comprise one or more electrical windings surrounding the winding legs of a magnetic core, the windings and core being immersed in a dielectric liquid in an enclosed tank. The dielectric liquid serves as a medium for cooling the windings as well as insulating them. The present invention is concerned primarily with a transformer having this type of structure, and in which one or more of the windings is of the so-called "foil wound" type. A foil wound coil may be defined as a coil of given axial length formed by flatwise winding upon itself a suitably insulated ribbon or strip of material having a low specific electrical resistance and whose width is substantially equal to the axial length of the coil. The thickness of the strip may vary from about 1 mil to 90 mils, depending upon the current that must be carried by the winding, and each turn of the strip constitutes one complete layer of the coil or winding.

When foil windings are employed in transformers, a number of advantages are derived that are not present in similar transformers employing wire windings. As an example, the maximum practical ratings of conventional transformers is limited by the maximum physical dimensions that may be adapted to present-day transportation facilities. When foil windings are employed, a substantial reduction in the space occupied by the windings is achieved, and since the reduction and size of the windings may result in smaller winding losses, a reduction in the size of the magnetic core is also feasible without increasing the total losses of the transformers or sacrificing of the electrical capacity thereof. Therefore, when foil windings are employed, either the size of the transformer may be reduced for the same power rating, or conversely the power rating of a transformer of a given size may be greatly increased.

In addition, the foil configuration of the winding material lends itself more readily to the mechanization of the coil winding operation than a wire winding. Foil windings also provide greater mechanical strength to resist internal electromagnetic forces resulting, for example, from short circuit currents, and foil windings have greater uniform inherent distribution of transient voltage stresses, such as may arise from lightning or switching surges, so that the danger of breakdown of the insulation as a result of such surges is substantially reduced as compared with conventional wire windings.

In view of the advantages derived from minimizing the dimensions of the windings of a transformer, it is desirable that the insulation between the foil turns be as thin as possible. Conventionally, this insulation material is comprised solely of paper or other fibrous material that has a wicking action, so that the dielectric liquid of the transformer may completely permeate the insulating material and thus reduce the danger of reduced dielectric strength of the winding due to the presence of voids in the insulation. While materials having dielectric strengths substantially greater than paper or other fibrous materials are available, it has been found that the use of such materials as the only insulation between the foil turns results in the occurrence of voids between the adjoining surfaces of the foil and insulating material, and immersion of the winding in a dielectric liquid does not remove the voids. These voids, or air bubbles, are undesirable, since the dielectric strength and dielectric constants of the air bubbles and insulating material is substantially different, and as a result the air bubbles are electrically stressed to a much greater extent than the insulating material, and consequently ionization and corona may readily occur in the entrapped air bubbles, resulting in damage and ultimate destruction of the turn insulation of the winding.

The use of only fibrous insulation has also resulted in serious problems in the manufacture of the winding. Fibrous insulation such as paper normally has a substantial moisture content as it is wound into the coil, and this moisture is generally removed from the insulation by various heat treatments after the coil has been wound. Due to the different thermal coefficients of expansion between the untreated paper and the material of the winding which may for example be aluminum or copper, the treatment of the coil by heat to remove the moisture in the fibrous insulation material may result in tearing or buckling of the insulation, and buckling of the foil material. Tearing of the insulation is, of course, undesirable since it results in a reduction in the dielectric strength of the coil. A buckling of the foil may result in the occurrence of relatively sharp bends in the foil that may give rise to corona and consequent insulation breakdown in the completed winding. Buckling of the foil also reduces the ability of the winding to resist subsequent short circuit forces. While the danger of buckling of the insulation and foil after the fibrous insulation has been dried is not as great, since its thermal coefficient of expansion is then about the same as the foil, such insulation materials do not have sufficient tensile strength to resist tearing that may result from adverse stress conditions that may occur in the winding, for example, upon the occurrence of a short circuit on the winding. The buckling in the winding and the tearing of the fibrous insulation result in part from the use of foils sufficiently thick to carry the necessary current, since thinner foils such as are employed in non-current carrying structures of a similar nature may be deformed without tearing the fibrous insulation. The problem of buckling also results in part from the size of the winding, the buckling being much more severe in large windings having an axial length of, for example, 50 inches, than in the case of small windings having lengths of, for example, less than about 20 inches.

It is, therefore, an object of this invention to provide an improved foil winding for stationary electrical induction apparatus.

It is another object to provide means for reducing the necessary thickness of turn insulation in foil wound windings for stationary electrical induction apparatus.

Still another object of this invention is to provide means for employing non-fibrous insulation material as the turn insulation of a foil wound stationary electrical apparatus, the means being characterized by the fact that it reduces the danger of the occurrence of voids in the insulation.

A further object of this invention is to provide a stationary electrical induction apparatus of the type having at least one foil winding, the apparatus being characterized by the fact that the physical dimensions of the foil winding are reduced by employing non-fibrous turn insulation, and that means are employed for eliminating the occurrence of voids in the winding.

It is a still further object of this invention to provide means for reducing the occurrence of buckling and tearing of insulation and buckling of the foil in the windings of foil wound stationary electrical induction apparatus.

Briefly stated, in accordance with my invention, I provide a stationary electrical induction apparatus comprising a winding immersed in a dielectric liquid. The winding comprises a flatwise concentrically wound conducting foil or strip tightly interwound with a laminar insulating material in such a manner that the laminar insulating material separates the turns of the foil. The laminar insulating material comprises a central insulating film surrounded on both sides by a sheet of fibrous material, i.e., a material exhibiting a substantial wicking action. The sides of the fibrous material contact the foil and separate it from the central insulating film, and the edges of the fibrous material are in contact with the dielectric liquid. The foil extends continuously between a pair of terminals, which may be designated as the radially inner and outer terminals, or the starting and finish terminals, so that current flows through the foil between the terminals either upon the application of a power source to the terminals or as a result of voltages induced in the winding.

While the specification concludes with claims particularly pointing out and distinctly claiming the subject matter which I regard as my invention, it is believed that the invention will be better understood from the following description taken in connection with the accompanying drawings.

In the drawings:

Fig. 1 is a perspective partially cross-sectional view of a transformer which may employ the arrangement of my invention, and Fig. 2 is a perspective view of a portion of a foil wound transformer according to my invention, with the end of the winding separated to illustrate the insulating structure thereof.

Referring now to the drawings, and more in particular to Fig. 1, therein is illustrated a transformer comprising a magnetic core 10. The core 10 has a winding leg 11 upon which is disposed electrical windings 12. The core 10 and windings 12 are disposed as a unitary structure within a tank 13, which may be sealed, and the tank 13 is filled with a dielectric liquid such as transformer oil to a sufficient depth, for example, to the level 14, to completely immerse the windings. Electrical insulating bushings 15 may be mounted on the tank 13 in order to provide means for making external connections to the windings 12. While the core 10 is illustrated in Fig. 1 as being a single phase core of the split lamination miter joint type, it will be obvious that other types of cores may be employed without departing from the spirit and scope of my invention.

Referring now to Fig. 2, which more clearly illustrates the winding of my invention, therein is illustrated a magnetic core 21 having a winding leg 22 surrounded by an insulating cylinder 23. The insulating cylinder 23 is surrounded by a winding 24 comprised of a flatwise concentrically wound conducting foil 25 interwound with a laminar insulating material 26. The ends of the laminar insulating material 26 are illustrated as separated to show the use of three separate layers, i.e., a central layer 27 separated from contacting the foil 25 by outer insulating layers 28. The insulating layers 27 and 28 extend beyond the edges of the foil 25 to provide creepage distance between the edges of adjacent turns of the foil, since each turn of the foil constitutes one layer of the winding and a potential difference exists between adjacent foil turns.

The foil 25 extends continuously between a pair of terminals, such as a radially inner axially extending terminal 30 and a radially outer axially extending terminal 31 so that an electric current will flow through the foil between the terminals 30 and 31 when a source of electrical power is connected between the terminals, or a load is connected across the terminals 30 and 31 and a potential is induced in the winding. The foil 25, which may also be called a ribbon or strip, has sufficient thickness to carry the necessary current for the transformer, and may in conventional practice have a dimension of about 1 mil to about 90 mils.

The outer insulation layers 28 are comprised of a fibrous insulating material, such as paper, that exhibits a substantial wicking action. The inner insulation layer 27 is comprised of a film of an insulating material having substantially greater dielectric strength than that of the outer fibrous insulation layers 28. The edges of the porous insulating layers 28 extend into the dielectric liquid of the transformer so that, by wicking action, liquid replaces any entrapped air from the windings.

As stated previously, the film insulation layer 27 should have high dielectric strength. It must also be thermally stable within the normal operating temperature range of the transformer (up to about 135° C.), and it must be chemically stable so that it does not react with the other materials in the apparatus. It is also necessary, in order to prevent buckling in the winding during service and treatment, that the film have approximately the same thermal coefficient of expansion as that of the foil. As a further requirement, in order to prevent tearing during treatment or service of the transformer, the film layer must have sufficient mechanical strength. In order to achieve this objective, the film material should have a tensile strength substantially greater than that of conventional fibrous insulation (i.e., about 5,000–8,000 p.s.i.), and it is preferred that the tensile strength of the film material be at least 15,000 p.s.i.

As an example of a material suitable for use as the film dielectric, I have found that polyethylene terephthalate resin, which exhibits the above characteristics may be advantageously employed as the film dielectric material in a transformer according to my invention. A foil wound transformer employing this material surrounded on either side by a layer of paper was found to have a higher dielectric strength and less tendency to tear and buckle than a similar transformer employing only paper as the insulation. Further, since a film of polyethylene terephthalate is thinner than a layer of fibrous material having the same dielectric strength, the transformer employing the film insulation as above has smaller dimensions than a transformer employing only fibrous material as the turn insulation. Other materials, such as polyurethane and polycarbonate, also exhibit the characteristics required for the film dielectric material, and it will be obvious that such materials may also be employed in combination with fibrous insulation in a foil wound transformer without departing from the spirit or scope of the invention.

While my invention has been disclosed with reference to the turn insulation between the turns of foil being comprised of a laminar structure comprising only one film layer surrounded on each side by one layer of fibrous material, it will be obvious that more insulation layers may be provided as long as the non-porous elements, i.e., foil and film layers, are separated by layers of fibrous material, so that all air entrapped in the winding may be replaced by dielectric liquid as a result of the wicking action of the fibrous layers.

It will be understood, of course, that, while the form of the invention herein shown and described constitutes the preferred embodiment of my invention, it is not intended herein to illustrate all of the possible equivalent forms or ramifications thereof. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What I claim as new and desire to secure by Letters Patent of the United States is:

1. Stationary electrical induction apparatus comprising a winding immersed in a dielectric liquid, said winding comprising a flatwise concentrically wound conducting foil interwound with a laminar insulating material so that the laminar insulating material separates the turns of said foil, said laminar insulating material comprising a central insulating film surrounded on both sides by a sheet of fibrous material, the sides of said fibrous material contacting said foil and the edges thereof contacting said dielectric liquid, said foil extending continuously between a pair of terminals.

2. Stationary electrical induction apparatus comprising a winding immersed in a dielectric liquid, said winding comprising a flatwise concentrically wound elongated conducting foil tightly interwound with an elongated laminar insulating material so that the turns of said foil are separated only by said laminar material, said laminar material extending axially beyond each edge of said foil and being comprised of a central insulating film surrounded on both sides by a sheet of fibrous material exhibiting a substantial wicking action, the edges of said fibrous material contacting said dielectric liquid so that said liquid permeates said winding due to the wicking action of said fibrous material, said foil extending continuously between a pair of terminals.

3. Stationary electrical induction apparatus comprising a winding immersed in a dielectric liquid and surrounding a magnetic core member, said winding comprising a flatwise concentrically wound elongated conducting foil tightly interwound with an elongated laminar insulating material so that the turns of said foil are separated only by said laminar material, said laminar material extending axially beyond each edge of said foil and being comprised of a central insulating film layer surrounded on each side by a layer of fibrous material exhibiting a substantial wicking action, said insulating film layer having a tensile strength of at least 15,000 p.s.i. and having a thermal coefficient of expansion substantially the same as that of said foil, the dielectric strength of said film layer being substantially greater than that of said fibrous material, the edges of said fibrous material contacting said dielectric liquid so that said liquid permeates said winding due to the wicking action of said fibrous material, said foil extending continuously between a pair of terminals.

4. Stationary electrical induction apparatus comprising a magnetic core, cylindrical insulating means surrounding a portion of said core, an electrical winding surrounding said cylindrical insulating means, and a dielectric liquid surrounding said winding, said winding comprising a flatwise concentrically wound elongated conducting foil tightly interwound with an elongated laminar insulating material so that the turns of said foil are separated only by said laminar material, said laminar material extending axially beyond each edge of said foil and being comprised of a central insulating film layer surrounded on both sides by a layer of fibrous material exhibiting a substantial wicking action, the thermal coefficient of expansion of the material of said film layer being substantially the same as that of said foil, the edges of said fibrous material contacting said dielectric liquid so that said liquid permeates said winding due to the wicking action of said fibrous material, and a pair of terminals connected respectively to the radially inner and radially outer ends of said foil so that said foil extends continuously between said terminals.

5. A transformer comprising a magnetic core having a winding leg, and a winding surrounding said leg, said winding being immersed in a dielectric liquid and comprising a flatwise concentrically wound elongated conducting foil tightly interwound with an elongated laminar insulating material, said laminar insulating material providing the only separation between the turns of said foil, said laminar material extending axially beyond each edge of said foil and being comprised of a central insulating film layer surrounded on each side by a layer of fibrous material exhibiting a substantial wicking action, the sides of said fibrous material contacting said foil, the edges of said fibrous material contacting said dielectric liquid so that said liquid permeates said winding due to the wicking action of said fibrous material, said foil extending continuously between a pair of terminals which are adapted to be connected to a source of electrical energy in such a manner that they are at different potentials, thus causing current to flow linearly through said foil from one terminal to the other, the resulting $I^2R$ losses in said foil being appreciable, said central insulating film having substantially the same thermal coefficient of expansion as said foil, but said fibrous material having a thermal coefficient of expansion different from that of said foil, the axial height and the thickness of said winding being such that when current surges are applied to said foil the magnitude of the axial thermal expansion thereof causes tearing of said fibrous material, but only said fibrous material, whereby said central insulating film remains intact and provides an uninterrupted insulating layer between adjacent turns of the foil.

6. The transformer of claim 5 in which the material of said film layer is thermally stable up to a temperature of at least 135° C.

7. The transformer of claim 5 in which said fibrous material is paper, said central insulating film layer is comprised of polyethylene terephthalate, and said foil is aluminum foil.

8. In a transformer, a winding comprising a flat, concentrically wound conducting foil interwound with a laminar insulating material so that the laminar insulating material separates adjacent turns of said foil, said laminar insulating material comprising a central insulating film surrounded on both sides by a sheet of fibrous material, the sides of said fibrous material contacting said foil, said foil extending continuously between a pair of terminals which are connected to a source of electrical energy in such a manner that they are at different potentials, thus causing current to flow linearly through said foil from one terminal to the other, the $I^2R$ losses in said foil being appreciable, said central insulating film having substantially the same thermal coefficient of expansion as said foil, but said fibrous material having a thermal coefficient of expansion different from that of said foil, the height and thickness of said foil being such that when current surges are applied to said foil the magnitude of the thermal expansion thereof causes tearing of said fibrous material, but only said fibrous material, whereby said central insulating film remains intact and provides an uninterrupted insulating layer between adjacent turns of foil.

9. An intermediate product in the manufacture of a transformer comprising a core leg surrounded by a winding of conducting foil concentrically interwound with a laminar insulating material, said laminar insulating material comprising a central insulating film surrounded on both sides by a sheet of fibrous material, the sides of said fibrous material contacting said foil and extending axially beyond the edges thereof, said fibrous material having substantial moisture content that must be removed before said intermediate product is usable as a transformer, the thermal coefficient of expansion of said fibrous material being different from that of said foil, but the thermal coefficient of expansion of said insulating film being substantially the same as said foil, whereby upon heat treating of said intermediate product to remove the moisture therefrom the magnitude of the thermal expansion of said foil with respect to said fibrous material caused by the difference in their respective coefficients of expansion is sufficient to tear said fibrous material, but only said fibrous material, said central insulating film remaining intact and thus providing an uninterrupted insulating layer between adjacent turns of foil.

References Cited in the file of this patent

UNITED STATES PATENTS

| | | |
|---|---|---|
| 1,846,887 | Matthews | Feb. 23, 1932 |
| 2,521,513 | Gray | Sept. 5, 1950 |
| 2,572,808 | Jackson | Oct. 23, 1951 |
| 2,892,166 | Sloat et al. | June 23, 1959 |

FOREIGN PATENTS

| | | |
|---|---|---|
| 737,443 | Great Britain | Sept. 28, 1955 |